Sept. 17, 1929.   W. B. FLANDERS   1,728,268
BEARING HOUSING
Filed June 3, 1927
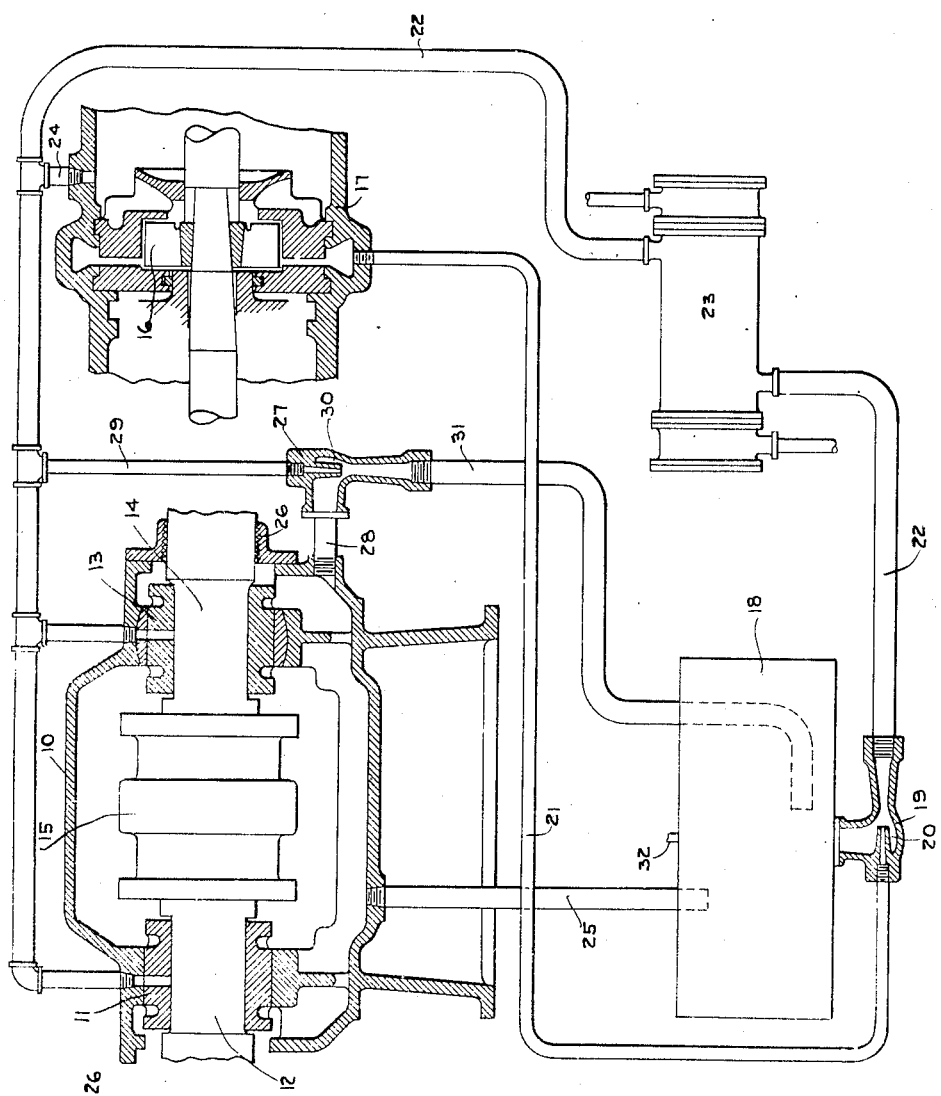
WITNESSES:
E. Lutz
INVENTOR
W.B.Flanders
BY   a.B.Reivis
ATTORNEY Patented Sept. 17, 1929

1,728,268

UNITED STATES PATENT OFFICE

WARREN B. FLANDERS, OF PHILADELPHIA, PENNSYLVANIA, ASSIGNOR TO WESTINGHOUSE ELECTRIC & MANUFACTURING COMPANY, A CORPORATION OF PENNSYLVANIA

BEARING HOUSING

Application filed June 3, 1927. Serial No. 196,223.

My invention relates to a bearing housing, more particularly to a housing for a bearing which is continually supplied with liquid lubricant, and it has for an object to withdraw from the housing the lubricant vapor which is formed therein and to condense the same.

A more specific object is to provide improved apparatus for the purpose stated, which shall require no attention during operation and which shall efficiently condense the vapor.

A portion of the liquid lubricant supplied to the bearing of a rapidly rotating shaft, for example, the shaft of an electrical generator or of a turbine driving the same, is vaporized by the raised temperature of the bearing. A portion thereof is also atomized or broken up into finely divided particles which are suspended in the adjacent gaseous media.

The term "lubricant vapor" is used in a broad sense in this specification, and is intended to embrace both the lubricant which has been transformed into the true gaseous state and also the atomized or finely divided suspended particles which form a mist.

It is desirable to retain this vapor, particularly so in the case of a turbo-generator, since such vapor has an injurious effect on the generator insulation. It is the general practice to enclose the bearings in housings to retain lubricant vapor, packing being provided at the shaft openings to prevent its escape. It has also been proposed to withdraw the vapor from the housing and to condense the same.

In accordance with my invention, I provide an ejector for withdrawing the vapor from the housing, the ejector being motivated by liquid lubricant supplied from some part of the lubrication system. The vapor is thus brought into intimate contact with liquid lubricant and is condensed and the particles of suspended lubricant when brought into intimate contact with the liquid lubricant readily unite therewith. In order to more effectively condense the vapor, it is desirable to provide liquid lubricant of low temperature, and therefore liquid lubricant is preferably supplied to the ejector which has just passed through the cooler.

The ejector has no moving parts and therefore requires no attention during operation. A simple and reliable apparatus for withdrawing lubricant vapors is therefore provided.

Apparatus exemplifying my invention is illustrated in the accompanying drawing in which:

The single figure is a diagrammatic view, with parts in section.

Referring to the drawing in detail, I show a bearing housing 10 containing a bearing 11 in which is mounted one end of a generator shaft 12, and a bearing 13 supporting the adjacent end of a turbine shaft 14. The ends of the shafts are connected by a coupling 15 of any suitable construction through which the turbine shaft 14 drives the generator shaft 12. Another portion of the shaft 14 is provided with an impeller 16, forming a part of a lubricant pump 17.

A lubricant reservoir 18 is provided which contains the lubricant returned from the lubrication system. Disposed below the reservoir 18 is an ejector 19, having an entraining chamber 20 adapted to receive lubricant flowing from the reservoir by gravity. A conduit 21, communicating with a discharge passage of the pump 17, supplies liquid lubricant to the ejector 19 under pressure for motivating the same. A conduit 22 communicates with the discharge end of the ejector 19 and receives the lubricant discharged therefrom. A lubricant or oil cooler 23 is interposed in the conduit 22 and is adapted to cool the lubricant flowing through the conduit 22. The conduit 22 communicates with the inlet of the pump 17 through a branch conduit 24 and supplies the same with lubricant. The conduit 22 also supplies lubricant to the bearings 11 and 13, and preferably, to all other bearings of the turbine and generator. The liquid lubricant discharged from the bearings 11 and 13 collects in the bottom of the housing 10 and is drained through a drain conduit 25 to the reservoir 18 which is disposed at a level below that of the housing 10.

The bearing housing 10 is provided with any suitable form of packing indicated at 26, preferably labyrinth packing. An ejector 27 is provided which has an entraining chamber 30 communicating with the interior of the bearing housing through a conduit 28. The ejector is supplied with liquid under pressure for motivating the same through the branch conduit 29 which communicates with the conduit 22. The discharge connection of the ejector communicates with a conduit 31 leading to the reservoir 18.

The operation of the above described apparatus is as follows: The pump 17 develops a fluid pressure, for example, 50 pounds per square inch, which is communicated through the conduit 21 to the ejector 19. A quantity of lubricant from the reservoir 18 is entrained in the ejector 19 and discharged to the conduit 22 at a lower pressure, for example 5 pounds per square inch. This lubricant passes through the cooler 23, in which its temperature is substantially reduced and from which it is supplied to the inlet of the pump 17, to the bearings, and to the ejector 27.

The lubricant supplied to the bearings 11 and 13 is heated by the rapid rotation of the shafts mounted therein, and a portion thereof is vaporized, being transformed into the true gaseous state by the heat of vaporization. A portion of the lubricant is also atomized or broken up into finely divided particles which are suspended in the air and gaseous lubricant within the bearing housing. The lubricant vapors thus generated fill the housing 10 and slowly escape by the packing 26 unless withdrawn.

The ejector 27, motivated by the cooled lubricant supplied through the conduits 22 and 29, creates a partial vacuum in the entraining chamber thereof, causing the lubricant vapor and other gaseous media in the housing 10 to flow through the conduit 28 to the entraining chamber, in which it is entrained in the liquid lubricant flowing through the ejector 27.

As the lubricant vapors are entrained in the liquid lubricant, the suspended particles are brought into intimate contact with the body of liquid and unite therewith. The lubricant in gaseous state delivers its heat of vaporization to the body of liquid and is condensed, also uniting therewith. The liquefied lubricant flows to the reservoir 18 through the conduit 31 and is again used in the lubrication system.

A slight vacuum is maintained in the housing by the ejector 27. A slight flow of air into the housing by the packing 26 is therefore obtained. The possibility of the escape of lubricant vapors by the packing is thus eliminated. The air mixed with the lubricant vapors is withdrawn with them and is separated from the lubricant in the reservoir 18, from which it returns to the atmosphere by way of a suitable vent 32.

It will thus be seen that I have provided a simple and compact apparatus for eliminating escape of lubricant vapors from the bearing housing. It may be readily applied to existing lubrication systems, as only an ejector and connecting conduits are required to be added. As there are no moving parts, no attention on the part of the operator is required, when the turbo-generator is in operation.

The lubricant vapors are not only removed but are also returned to the lubricant reservoir in liquid state for reuse.

While I have shown the ejector 27 as supplied with lubricant from the conduit 22, which contains cooled lubricant, it will be apparent that I may connect it with any part of the system which contains lubricant under pressure, and provide any suitable means for cooling the same.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art, or as are specifically set forth in the appended claims.

What I claim is:—

1. The combination with a bearing and a housing therefor, of a lubrication system for supplying lubricant to the bearing including means for cooling the lubricant, an ejector for withdrawing the lubricant vapor from the housing, means for supplying cooled liquid lubricant from the cooling means to the ejector for entraining the lubricant vapors from the bearing housing and condensing the same, and means for returning said lubricant to the lubrication system.

2. The combination with a bearing and a housing therefor, of means for supplying liquid lubricant to said bearing, means for cooling said liquid lubricant, and means for entraining the lubricant vapor generated by said bearing in the lubricant discharged from said cooling means.

3. The combination with a bearing and a housing therefor, of an ejector having an entraining chamber, said chamber communicating with the space enclosed by the housing, and means for cooling liquid lubricant and for supplying cooled lubricant to the bearing and to the ejector.

In testimony whereof, I have hereunto subscribed my name this 24th day of May, 1927.

WARREN B. FLANDERS.